March 10, 1953  G. S. ARNOLD  2,630,831
FLUSH VALVE
Filed Nov. 11, 1944  2 SHEETS—SHEET 2
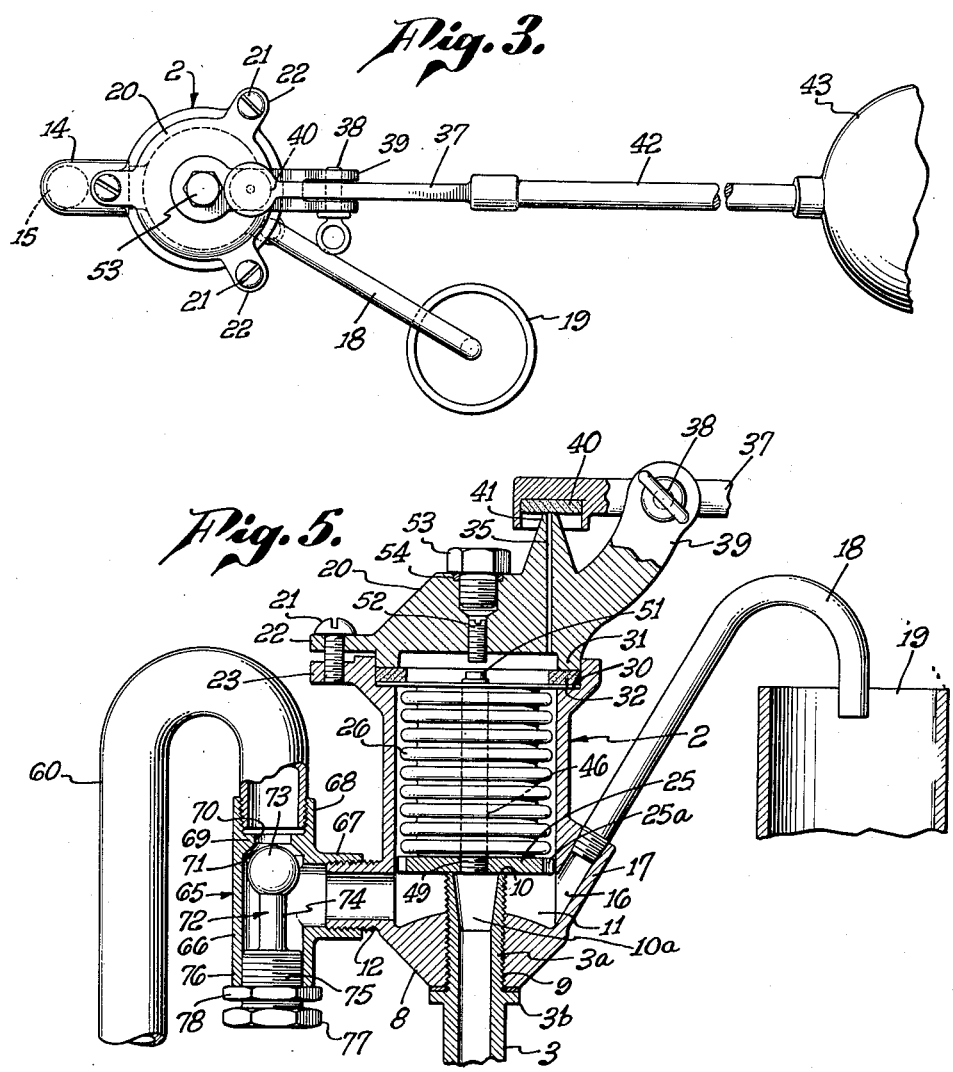
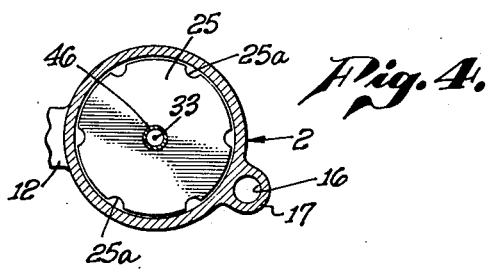
GLOYD S. ARNOLD,
INVENTOR.
BY
ATTORNEY.

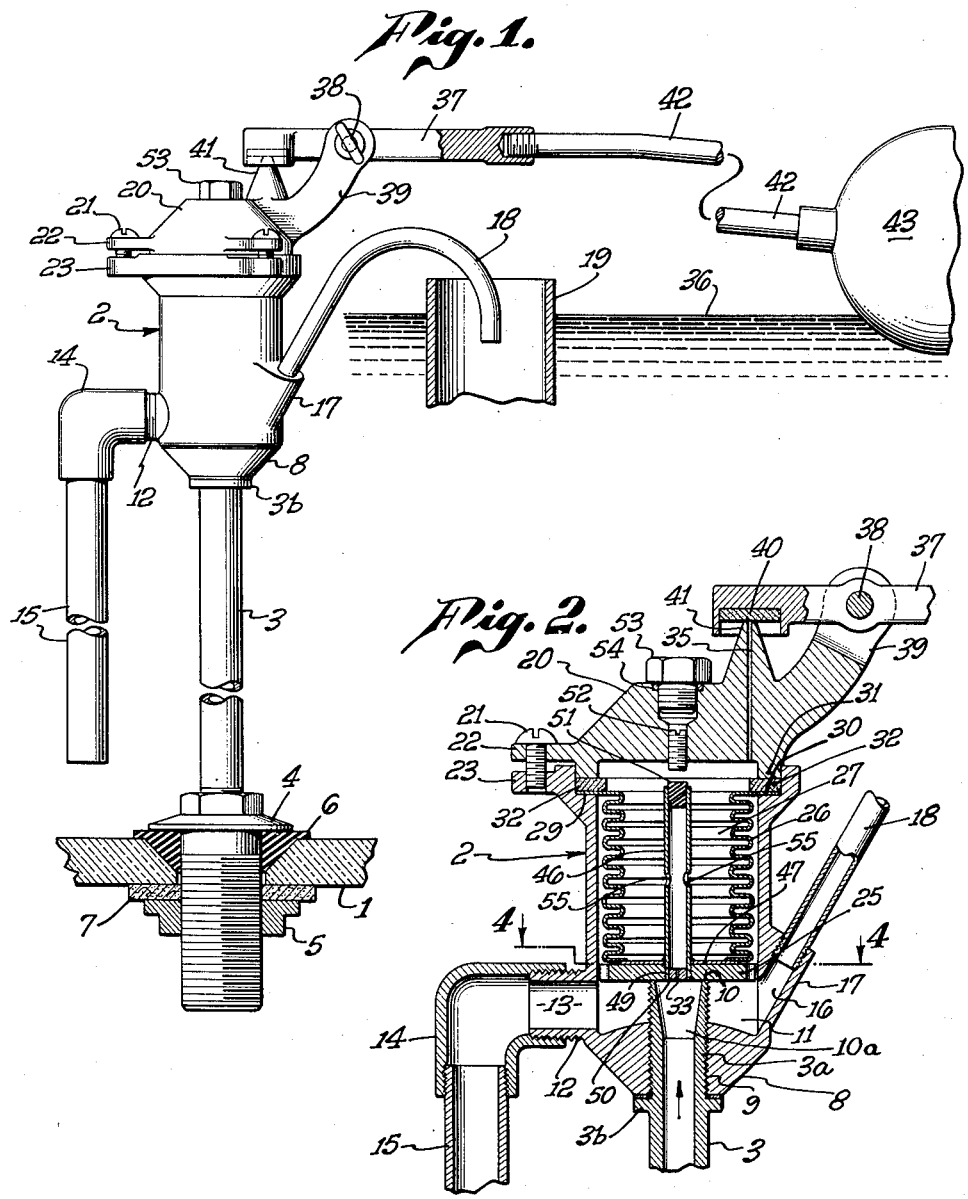

Patented Mar. 10, 1953

2,630,831

UNITED STATES PATENT OFFICE 2,630,831

FLUSH VALVE

Gloyd S. Arnold, Manhattan Beach, Calif.

Application November 11, 1944, Serial No. 563,000

2 Claims. (Cl. 137—669)

This invention relates to a differential valve; and more particularly to such a valve arranged to be controlled by a float in accordance with changes in a liquid level.

Float controlled valves are extensively used for maintaining an appropriate supply of water in tanks for various purposes, such for example, as flushing a water closet, and when used in connection with a water closet flush tank, are commonly termed "ball cocks." It is an object of this invention to provide an improved valve for such use.

Differential type valves for such use are known, and generally include a closure member for closing the inlet, so arranged that the inlet pressure acts continuously on a reduced area of the member tending to unseat it and open the inlet, and means whereby such pressure acts in a controlled manner on a larger area to seat the closure member and maintain the valve closed. The float is arranged to cause release of such closing pressure when the liquid level falls below a predetermined height, thus causing the valve to open. When the liquid level rises to this predetermined height, the float acts to cause the closing pressure to be built up, and close the valve.

Such valves often employ a flexible diaphragm for the closure member, or else the closure member is carried by a packed piston slidable in a cylinder. Either of these arrangements has certain disadvantages. Thus, a diaphragm when so used, becomes distorted and stretched, due to the action of the closing pressure over a large, poorly supported area of the diaphragm. This causes improper action of the diaphragm as it moves between port opening and closing position, and may prevent improper closing of the port so that the valve leaks. The piston and cylinder construction is objectionably costly and requires considerable attention to prevent leakage past the piston. It is thus another object of this invention to provide a differential valve which is inexpensive to manufacture, and which does not deteriorate with use and/or require frequent attention.

It is another object of this invention to provide such a valve having an improved means for mounting the closure member.

It is another object of this invention to provide such a valve having improved means for controlling the extent of opening of the valve.

It is another object of this invention to provide such a valve capable of preventing reverse flow of liquid through the valve in the event of suction pressure in the supply line. In this way the siphoning of water from the flush tank is prevented without the necessity of providing a vacuum breaker.

It is still another object of this invention to provide such a valve incorporating a novel form of flow silencer.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is an elevation, partly in section, showing a float controlled valve, incorporating the features of the invention, installed in a flush tank;

Figure 2 is substantially a longitudinal axial section, on an enlarged scale, of the valve of Figure 1;

Figure 3 is a top plan view of the structure of Figure 1;

Figure 4 is a cross section taken on line 4—4 of Figure 2; and

Figure 5 is a view similar to Figure 2, but showing a modified form of the invention.

Referring to Figure 1 of the drawings, the valve structure is shown as installed in the usual manner in a conventional closet flush tank, a fragment of the bottom of which is shown at 1. For this purpose the body 2 of the valve structure is secured on the upper end of a tubular member 3 which is supported in a conventional fitting 4. This fitting 4 is secured to the flush tank bottom 1 by a nut 5, suitable washers 6 and 7 being provided to prevent leakage from the tank past the fitting 4.

As shown in Figure 2, the valve body 2 is hollow and generally cylindrical, being tapered at its lower end 8, and internally threaded at 9 for engagement with the upper threaded end 3–a of the tube 3. The tube 3 is provided with a flange 3–b spaced from the upper end of the tube, so that when the body 2 is seated against the flange, the tube 3 extends a short distance into the body 2 providing a valve seat 10 and an inlet port 10–a.

The lower portion of the interior of the body 2 surrounds the portion of the tube 3 which is within the body and forms a discharge space 11 for receiving liquid from the port 10-a. An exteriorly threaded hollow boss 12 is formed on the body 2 and provides a discharge port 13 for passing liquid from the tube 3 to the flush tank when the valve is open. For this purpose an elbow 14 is shown as threaded on the boss 12, having a downwardly directed tail pipe 15 threadedly secured to it. This serves to direct the discharge downwardly as well as placing it near the bottom 1 of the flush tank, thus avoiding splashing and reducing noise. An additional outlet 16 is provided in a second boss 17 and supplies water to a conventional refill tube 18 which discharges into the overflow pipe 19 of the tank (Figure 1).

The body 2 includes a cap 20 secured to the body by a number of screws 21 passing through ears 22 on the cover 20 and threading into lugs 23 on the body 2. A closure member 25 of disc form is adapted to cooperate with the valve seat 10 to control the discharge of liquid from the inlet port 10-a and is of slightly smaller diameter than the inside of the body 2 so as to be freely slidable therein, the body 2 serving as a guide for the closure member. Sufficient clearance is provided by a plurality of peripheral notches 25-a in the closure member 25 to guard against any "dash pot effect" as the member 25 moves in the body 2. The closure member 25 is secured to the lower end of a metallic bellows or Sylphon 26, the upper end of which is attached to the body 2 by means of an integral outwardly extending annular flange 29 which is clamped against an annular shoulder 30 in the top of the body 2 by an annular rib 31 on the cover 20. A gasket 32 is interposed between the flange 29 and the rib 31 to prevent leakage at this point. The cover 21 thus cooperates with the bellows 26 to form an expansible chamber 27 to which liquid is admitted by a small pressure port 33 extending through the closure member 25.

Liquid under pressure from the inlet 10-a enters the chamber 27 through the port 33 where it acts on substantially the entire area of the upper side of the member 25 and urges the member toward the valve seat 10, maintaining it in position thereon, since the area of the inlet port 10-a on which the inlet pressure acts to unseat the member 25 is substantially less than the area on which the same pressure acts to maintain the member seated. Reduction of pressure in the chamber 27 allows the pressure in the inlet 10-a to raise the member 25 from the seat 10 and open the valve in a well understood manner.

For this purpose a control port 35 is provided in the cover 20 leading from the chamber 27, this port 35 being substantially larger than the pressure port 33. The control port 35 is opened and closed in response to changes in the level of the liquid 36. For this purpose a control arm 37 is pivotally mounted on a pin 38 secured in a bracket 39 formed on the cap 20. One end of the arm 37 extends over the port 35 and carries a resilient pad 40 adapted to cooperate with a valve seat 41 formed about the outer end of the port 35. The other end of the arm 37 has an extension 42 threaded therein, carrying the float member 43 which floats in the liquid 36. When the level of the liquid 36 falls below a predetermined height, the resultant downward movement of the float member 43 swings the pad 40 upwardly to uncover the control port 35. This permits discharge of liquid from the chamber 27 and unseating of the closure member 25, allowing liquid to flow into the flush tank from the inlet tube 3. When the liquid level rises to the predetermined height, the pad 40 is moved downwardly to close the control port 35, causing pressure to build up in the chamber 27 and seating the closure member 25.

It is desirable to control the rate of flow from the inlet 3 to avoid excessive noise, and for this purpose adjustable means are provided to control the amount of opening of the inlet port 10-a provided by the unseating of the closure 25. Thus, a tubular post 46 is provided, which extends axially of the chamber 27, and is secured adjacent its lower end, to the bottom 47 of the bellows 26 as by soldering. That portion of the tube 46 extending through the bottom 47 of the bellows is threaded at 49 for reception of the closure member 25. The lower end of the tube 46 is closed by a soft metal plug 50, through which the pressure port 33 extends.

The upper end of the tube 46 is closed by a rubber plug 51, which forms an abutment for cooperating with an adjustable stop, comprising a screw 52 threaded through the cap 20, for limiting the lift of the closure 25 above the seat 10. Adjustment of the screw 52 serves to alter the amount of such lift in an obvious manner. In this way the amount of liquid passed by the valve can be controlled; furthermore, excessive movement and possible rupture of the bellows 26 is prevented. The upper part of the bore accommodating the screw 52 is of enlarged diameter and threaded to accommodate a cap 53 which is provided with packing 54 to prevent escape of liquid from the chamber 27. The tube 46 is ported intermediate its ends, as at 55, to permit liquid from the pressure port 33 to freely enter the chamber 27.

An important feature of the present valve structure is that the resilience of the metallic bellows 26 is such as to always urge the closure member 25 to seat. Thus, if the pressure in the supply line and the tube 3 drops below atmospheric pressure, water cannot be siphoned out of the tank since the port 10-a is closed by the member 25. Instead, any partial vacuum which may be formed in the tube 3 merely urges the closure member 25 more tightly against its seat 10. In this way the need for a conventional vacuum breaker is avoided.

Means for additionally regulating the discharge may be provided if desired. A valve for this purpose is indicated at 65 in Figure 5, and is shown as threaded on the boss 12 in place of the elbow 14. As shown in that figure the regulating device is positioned to discharge upwardly into the conduit 60, so that any solid matter which may accumulate in the valve does not restrict the flow of water.

Referring in detail to the device 65, it comprises a T-shaped body 66 having an internally threaded boss 67 forming the inlet and adapted to be threaded on the boss 12 of the valve body 2. One end, as 68, of the body 65 is threaded to receive the discharge conduit. A wall 69 extends across the body adjacent the end 68 and has a discharge port 70 therein surrounded by a conical valve seat 71, which is inclined toward the discharge port. By having the valve seat 71 facing downwardly, any solids carried by the water do not lodge on the seat where they might hinder the discharge through the valve, but instead drop to the lower part of the body where they may accumulate without harm and be removed readily when necessary. A valve member 72 having a spherical head 73 cooperates with the seat 71 to control the discharge of liquid through the port 70. The valve member 72 is supported for movement toward and away from the seat 69 by a shank 74 having an enlarged portion 75 threadedly engaging the end 76 of the body 65. These threads are of rather fine pitch to permit ready adjustment of the head 73 with respect to the seat 71 by small increments. The valve member 72 is provided with a hexagon head 77 to facilitate adjustment of the discharge opening. A lock nut 78 may be provided if desired to maintain the valve member 72 in adjusted position.

I claim:

1. In a valve, a valve body having inlet and discharge ports, a closure movable to open and close said inlet port, a metal bellows having an end wall and secured to said body adjacent its opposite end to form a closed chamber, a tubular member extending axially of the bellows through said end wall and secured to said wall, means forming an abutment on the end of said member remote from said wall, means securing said closure on the opposite end of said member and adjacent said wall, whereby said closure and said bellows are maintained in assembled relation, stop means in said body cooperating with said abutment to limit movement of said closure in port opening direction, means whereby said tubular member maintains said chamber in continuous communication with said inlet port, and a control port for permitting fluid to discharge from said chamber to control movement of said closure.

2. In a valve, a valve body having inlet and discharge ports, a closure member guided for movement axially of the inlet port to open and close said inlet port, a metal bellows secured to said closure and cooperating with the body to form an expansible chamber, a tubular member secured to said closure and forming an abutment, adjustable stop means in said body cooperating with said abutment to limit movement of said closure in port opening direction, said bellows, said tubular member, and said stop means being in axial alignment with the inlet port, there being a port connecting the interior of said tubular member with the inlet port, the interior of the tubular member communicating with the interior of the bellows, a control port for discharging liquid from said chamber, and means controlling the discharge from said port.

GLOYD S. ARNOLD.

REFERENCES CITED

The following references are of record in the file of this patent:

UNITED STATES PATENTS

| Number | Name | Date |
|---|---|---|
| 756,291 | Schossow | Apr. 5, 1904 |
| 802,330 | Schulze | Oct. 17, 1905 |
| 925,538 | Weaver | June 22, 1909 |
| 1,129,533 | Williams | Feb. 23, 1915 |
| 1,176,535 | Fulton | Mar. 21, 1916 |
| 1,508,398 | Kelly | Sept. 16, 1924 |
| 1,589,640 | Gulick | June 22, 1926 |
| 1,663,701 | Hedges | Mar. 27, 1928 |
| 1,676,084 | Flagg | July 3, 1928 |
| 2,114,858 | Rosch | Apr. 19, 1938 |
| 2,147,332 | Cornelius | Feb. 14, 1939 |
| 2,463,921 | Titcomb | Mar. 8, 1949 |

FOREIGN PATENTS

| Number | Country | Date |
|---|---|---|
| 595,853 | Germany | of 1934 |
| 652,782 | Germany | of 1937 |